United States Patent [19]

Wanner et al.

[11] 4,002,347
[45] Jan. 11, 1977

[54] TORQUE-TRANSMITTING SYSTEM

[75] Inventors: Karl Wanner, Echterdingen; Jörg Fälchle, Bempflingen; Wolfgang Schmid, Plattenhardt; Manfred Bleicher, Leinfelden; Reinhard Hahner, Kemnat; Werner Kleine, Jr., Uphusen, all of Germany

[73] Assignee: Robert Bosch GmbH, Stuttgart, Germany

[22] Filed: Jan. 16, 1975

[21] Appl. No.: 541,222

[30] Foreign Application Priority Data

Jan. 17, 1974 Germany .......................... 2402113
Feb. 22, 1974 Germany .......................... 2408557

[52] U.S. Cl. ............................ 279/19.3; 173/104
[51] Int. Cl.² .................... B23B 31/10; B25D 9/04
[58] Field of Search ............ 279/7, 19, 19.2, 19.3, 279/19.4, 19.6; 173/104, 111

[56] References Cited

UNITED STATES PATENTS 2,608,413   8/1952   Peck ................................... 279/19
3,166,131   1/1965   Worman .......................... 173/105

FOREIGN PATENTS OR APPLICATIONS 1,957,510   5/1971   Germany ......................... 173/104

*Primary Examiner*—Othell M. Simpson
*Assistant Examiner*—Z. R. Bilinsky
*Attorney, Agent, or Firm*—Michael J. Striker

[57] ABSTRACT

A torque-transmitting system, particularly a hammer drill, has a housing provided with a tool holder section, and a driven output shaft which is journalled in the housing and has a free end portion at the tool holder section. A tool has a shaft provided with an end portion of profiled cross-section, the profiling of the cross-section being inclined circumferentially of the end portion. A receiver for the end portion is formed in the tool holder and configurated for matingly receiving the profiled end portion, so that the tool is held in the tool holder section in motion-transmitting relationship with the free end portion of the shaft.

10 Claims, 5 Drawing Figures

TORQUE-TRANSMITTING SYSTEM

BACKGROUND OF THE INVENTION

The present invention relates generally to a torque-transmitting system, and in particular to such a system which is usable with special advantage (but not exclusively) in a hammer drill or the like.

It is known in the art to provide drill bits which are formed at a rear end of their shaft with splines whose edges extend parallel to the longitudinal axis of the drill bit. Such drills are used as a rule in manually held power drilling machines of relatively heavy size, that is machines weighing on the order of 20 or more pounds. It has been found that if this type of drill is used in smaller and therefore lighter power drilling machines, the lighter weight of the machines does not press the drill bit with sufficient force against the workpiece, so that at least under disadvantageous circumstances it may happen that the drill bit becomes momentarily separated from its axial abutment in the tool holder of the machine as the machine is operated. This is particularly true in hammer drills wherein the drill bit is not only rotated but also has axially acting impacts imparted to it. When a momentary separation between the rear end of the drill bit and its axial abutment in the tool holder of the housing of the machine occurs, the result is a loss in impact energy which is therefore not transmitted to the drill bit, and an increase wear of the splines will occur.

SUMMARY OF THE INVENTION

It is an object of the present invention to overcome the drawbacks of the prior art.

More particularly, it is an object of the present invention to provide an improved torque-transmitting system, which is especially well suited for use in hammer drills and the like, wherein the aforementioned disadvantages are avoided.

Still more particularly, it is an object of this invention to provide an improved torque-transmitting system in which an undesired disengagement of the tool and the tool holder is avoided under all circumstances.

Another object of the invention is to provide such a torque-transmitting system in which maximum torque is transmitted, but wherein the components are subject to minimum wear.

In keeping with these objects, and with others which will become apparent hereafter, one feature of the invention resides in a torque-transmitting system comprising a housing having a tool holder section, a driven output shaft journalled in the housing and having a free end portion at the tool holder section, a tool having a shaft provided with an end portion of profiled cross-section and whose profiling is inclined circumferentially of the end portion. A receiver is provided for the end portion, being formed in the tool holder section and being configurated for matingly receiving the profiled end portion of the tool shaft, so that the tool is held in the tool holder section in motion-transmitting relationship with the free end portion of the shaft.

The profiled cross-section of the tool shaft end portion may be configurated as a polygon, as an elipse or in fact with any suitable profiling that can be inclined circumferentially of the end portion, and of course a similar profiling will be formed in the receiver. If the output shaft rotates in the right-hand direction, then the circumferential inclination of the profiling will be in the same direction, and vice versa.

The torque which is transmitted when the output shaft and therefore the tool are rotated, results in the exertion of a force component active between the tool holder section and the end portion of the tool shaft, which presses the tool firmly against the workpiece. This force component is superimposed upon the impacts that are exerted axially upon the tool by the shaft, which in conventional manner may be reciprocated to exert such impacts, and assures that there is a reliable contact between the tool and the workpiece on the one hand, and between the end portion of the tool and the cooperating abutment in the receiver on the other hand. This, in turn, improves the transmission of energy via the tool to the workpiece, and therefore increases the effectiveness of the tool, such as a drill bit or the like. In fact, an improvement of between substantially 5 and 10+% in the drilling efficiency has been noted when a hammer drill utilizing the novel torque-transmitting system was employed, as compared to a similar hammer drill which did not utilize the system. Moreover, wear on the components, such as the end portion of the tool shaft and the receiver, is significantly reduced and vibrations are largely suppressed. It is particularly advantageous if the angle of twist at which the profiling of the end portion is inclined circumferentially of the end portion, is between substantially 10° and 20° if a general profiling is employed. If, however, in accordance with a further concept of the invention the end portion of the tool shaft is formed as a splined arbor having outer splines which are circumferentially inclined of the shaft end portion, then it has been found to be advantageous if the angle of twist of these splines is between substantially 75° and 85°. It will be appreciated that in the system according to the present invention the rotation of the tool holder section will tend to draw the end portion of the tool shaft axially inwardly of the receiver and maintain it in engagement with an axial abutment provided for this purpose, due to the circumferential inclination of the profiling of the splines, and of the corresponding recesses in the receiver. If the system is used in a hammer drill, this means that energy losses due to idling impacts are not possible, since the abutment (which transmits the impacts directly or indirectly to the rear end portion of the tool shaft) will always be in engagement with this rear end portion, and vice versa.

It has been found to be particularly advantageous if, when the rear end portion of the tool shaft is formed as a splined arbor, the angle of twist of the splines is 84°. It is further advantageous if the root width of the splines at their ends which face the forward end of the tool, that is which face away from the rear end portion, is smaller than the root width of the spline passages formed in the receiver and serving to receive the respective spline. In fact, it has been found to be particularly advantageous if this root width of the splines at the aforementioned location and the root width of the spline passages have a ratio of between 3:4 and 1:2.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
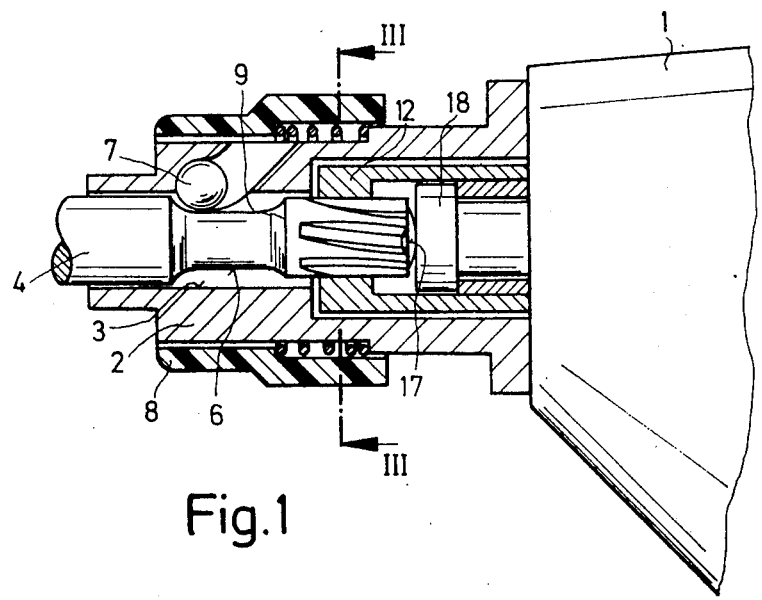
FIG. 1 is a fragmentary axial section illustrating the novel torque-transmitting system embodied in a hammer drill.
Figure 3:
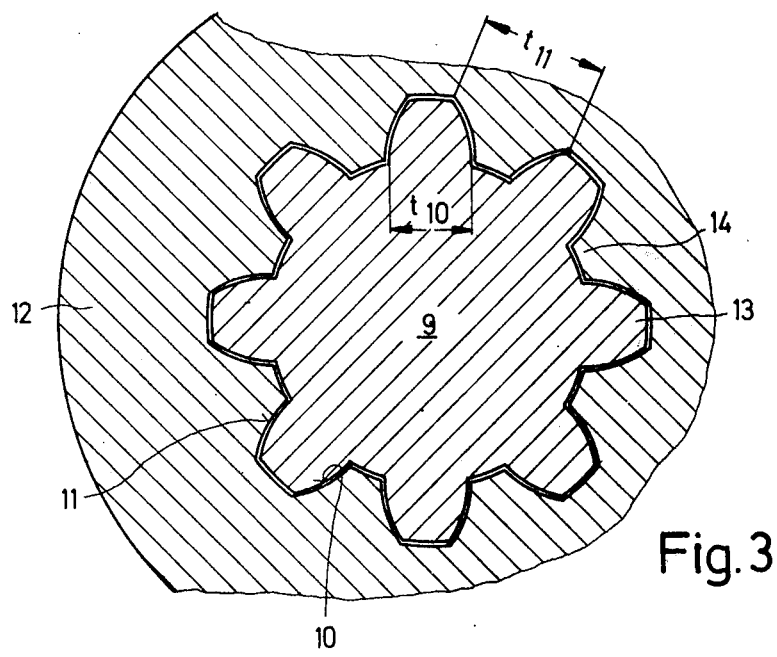
FIG. 3 is a fragmentary section taken on line III—III of FIG. 1, on an enlarged scale.
Figure 2:
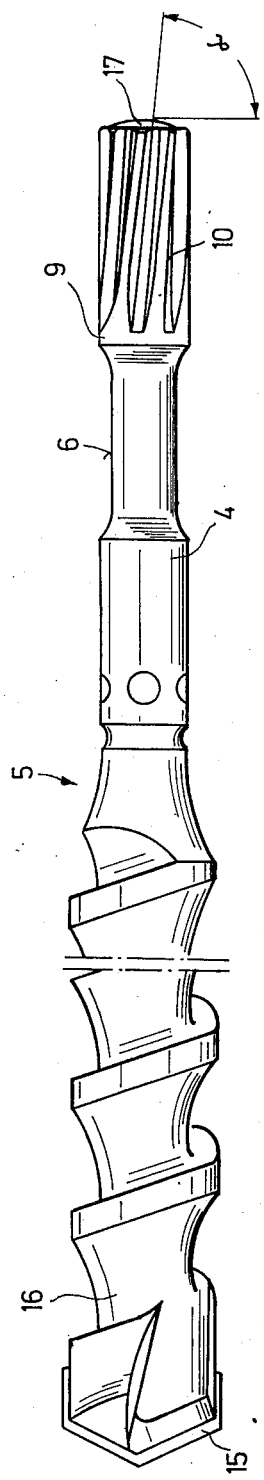
FIG. 2 is a side view of the tool of the system shown in FIG. 1.

The invention will be described on hand of an exemplary embodiment, as illustrated in FIGS. 1–3 of the drawing. In these Figures, reference numeral 1 identifies the partially shown housing of a hammer drill, which carries a tool mount 2 formed with a concentric passage 3 into which the shaft 4 of a tool, here a drill bit 5 (see FIG. 2) is insertable. The shaft 4 has a rear end portion 9 and is formed forwardly of the same with a single circumferentially extending groove 6. When the shaft 4 is received in the passage 3 as shown in FIG. 1, a detent member 7 — here in form of a ball — extends partly into the groove 6 to prevent axial withdrawal of the shaft 4 from the portion 2. The ball 7 is movably received in a passage 7a and can yield in radially outward direction in this passage 7a when an outer sleeve 8 (preferably of synthetic plastic material) that surrounds the portion 2 and is spring biassed towards the left in FIG. 1, is moved towards the right against the force of the spring, so as to permit movement of the ball 7 from its position shown in FIG. 1 in direction outwardly of the groove 7a, that is out of the groove 6.

The end portion 9 of the shaft 4 is formed as a splined arbor having splines 10 which extend in circumferential direction of the end portion 9 and are receivable in similarly circumferentially inclined spline passages that are formed in the tool holder 12 that is rotated in known manner. The angle of twist of the splines 10 and the associated spline passages 11 is steep and extends in the same direction as the direction of rotation of the tool holder 12; i.e. if the tool holder rotates in right-hand direction, the splines 10 and passages 11 will also be inclined in that direction, and vice versa. In the illustrated embodiment the angle of twist is 84°, and the angle of deviation from the center axis is 6°. Evidently, the two angles must complement one another to form a right angle. In the illustrated embodiment the root width $t_{10}$ of the splines 10, at least at their end regions which face forwardly of the shaft 4 (i.e. in FIG. 1 facing towards the left) is smaller than the root width $t_{11}$ of the spline passages 11 in the tool holder 12. In the particular embodiment that has been illustrated the root width $t_{10}$ has a ratio relative to the root width $t_{11}$ of 2:3. However, the ratio may be in the range of 3:4 to 1:2; the ratio of 3:2 has been found to be particularly advantageous where the torque-transmitting system is used in a hammer drill. The purpose of this differential root width is to assure that the spline passages 11 in the tool holder 12 will have a lifetime corresponding to the lifetime of several of the tools 5, and this aforementioned relationship assures a low wear. Moreover, the number of splines 10 and cooperating spline passages 11 should also be selected to assure minimum wear, and it has been found to be advantageous if the number of splines 10 and the corresponding number of spline passages 11 is between 6 and 10; in the particular embodiment illustrated it is 8. This reduces the stresses acting between the splines 10 and the spline passages 11, but yet makes it possible for the splines 10 to be sufficiently strong to withstand the stresses that do occur, and still permits the material of the splines 10 to be hardened to a sufficient depth.

The free end 17 of the shaft 4 is slightly convex, as shown in FIGS. 1 and 2; in the latter Figure the angle of twist is designated by $\alpha$. The free end 17 engages an abutment 18, here in form of an impact-transmitting member of the hammer drill. The manner in which impacts are transmitted to the member 18 and by the same to the end portion 9, is well known. Thus, axially acting impacts are superimposed upon the rotation of the shaft 4. The forward end (compare FIG. 2) of the tool 5 is configurated in the manner of a conventional drill bit, that is it has a head formed with a cutting edge 15, rearwardly of which the shaft 4 is provided with flutes 16 in which particles of the workpiece are conveyed out of a bore hole that is being formed with the tool.

Figures 4, 5:
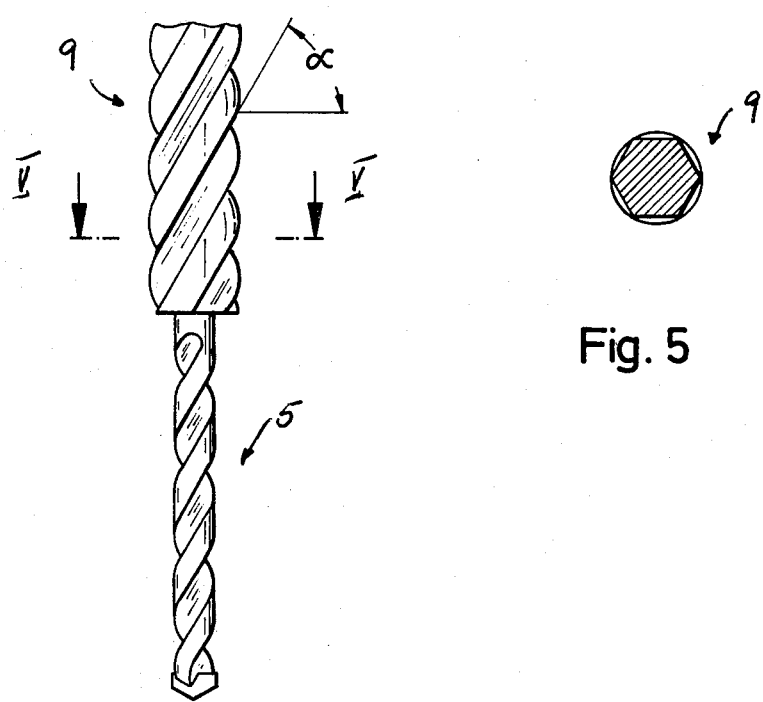
FIG. 4 is a view similar to FIG. 2, but of a different embodiment.
FIG. 5 is a section on line V—V of FIG. 4.

When the tool holder 12 rotates, in the illustrated embodiment towards the right or in clockwise direction, the torque which acts upon the tool 5 and produces an axially acting force upon the tool due to the steep angle of pitch or twist of the splines 10 and the associated spline passages 11, permanently tends to draw the tool 5 axially into the portion 2 and the tool holder 12, thereby assuring a constant abutment between the free end 17 and the member 18. This means not only that there is such a constant abutment, but also that the tool 5 itself tends to permanently push the member 18 to its rearward end position from which it is then accelerated forwardly when it transmits an impact. The advantage of this is that at the moment at which an impact is transmitted, there will be motion-transmitting engagement between the end 17 and the member 18, thus eliminating idling impacts, that is impacts where the member 18 is accelerated freely towards the end portion 17 that is out of engagement with it, so that energy is lost during this free acceleration. In an embodiment of the type disclosed by way of example in FIGS. 1–3, we have found that depending upon the diameter of the drill bit 5 we can obtain an improvement in the drilling effectiveness of between substantially 5 and 20% as compared to the prior art. Moreover, the wear upon the splines 10 and spline passages 11 is substantially reduced, as compared to known torque-transmitting systems. The constant engagement between the end portion 17 and the member 18, and the rearward urging of the member 18, also contributes to the increased efficiency of the novel torque-transmitting system by assuring that the member 18 will always be located in a position in which maximum impact force can be transmitted to it, and from it to the free end 17; this is important because all hammer drills, particularly those using an air-cushion impact transmitting arrangement, have a precisely defined impact point and will transmit maximum impact energy to the member 18 only if the latter is located at this impact point, a condition which is assured by the present invention for the reasons outlined above. The end portion of the shaft can also be polygonal and have a right-hand twist, i.e. the profiling of the end portion can be circumferentially inclined at an angle of twist $\alpha$ which may be between substantially 70° and 80°. This is shown in the otherwise self-explanatory FIGS. 4 and 5.

It will be understood that each of the elements described above, or two or more together, may also find a useful application in other types of constructions differing from the types described above.

While the invention has been illustrated and described as embodied in a torque-transmitting system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention.

We claim:

1. In a torque-transmitting system, a combination comprising a housing having a tool holder section rotatable in a predetermined direction; a driven output shaft journalled in said housing and having a free end portion at said tool holder section; a tool having a shank provided with a front portion and a rear portion provided with a rear end face and configurated as a splined arbor having outer splines which extend lengthwise of said shank towards said front portion and are also circumferentially inclined relative to the longitudinal axis of said tool from said rear portion towards said front portion in said predetermined direction and at an angle of twist of between substantially 70°–85°; and a receiver for said splined arbor formed in said tool holder section and having portions configurated for matingly receiving said splines and coacting with the latter for drawing said tool axially inwardly into said tool holder section in response to rotation of the latter due to the coaction between the inclined splines and portions, whereby said rear end face is held in motion-transmitting relationship with said free end portion of said output shaft.

2. A combination as defined in claim 1, wherein said angle is 84°.

3. A combination as defined in claim 1, wherein said rear portion has a free end and said outer splines extend from a location forwardly of said free end in direction towards the latter, said receiver having inner spline passages for said outer splines; and wherein the root width of said outer splines in the region of said location in smaller than the root width of said inner spline passages.

4. A combination as defined in claim 3, wherein said root width of said outer splines has a ratio of between 3:4 and 1:2 relative to the root width of said inner spline passages.

5. A combination as defined in claim 3, wherein said root width of said outer splines has a ratio of 2:3 relative to the root width of said inner spline passages.

6. A combination as defined in claim 3, wherein the number of outer splines and of inner spline passages is between six and ten.

7. A combination as defined in claim 6, wherein there are eight outer splines and an identical number of inner spline passages.

8. A combination as defined in claim 1, wherein said angle is between 75° and 85°.

9. In a torque-transmitting system, a combination comprising a housing having a tool holder section rotatable in a predetermined direction; a driven output shaft journalled in said housing and having a free end portion at said tool holder section; a tool having a shank provided with a front portion and with a rear portion which is of profiled cross-section and has a rear end face, the profiling of said rear portion extending lengthwise of said shank and also being inclined relative to the longitudinal axis of said tool towards said front portion at an angle of twist of between substantially 70°–85° and circumferentially of said rear portion in said predetermined direction; and a receiver for said rear portion formed in said tool holder section and having portions configurated for matingly receiving the profiled rear portion and coacting with the latter for drawing said tool axially inwardly into said tool holder section in response to rotation of the latter due to the coaction between the inclined profiling and said portions of said tool holder section, whereby said rear end face is held in motion-transmitting relationship with said free end portion of said shaft.

10. A combination as defined in claim 9, wherein said profiling is circumferentially inclined at an angle of twist of between substantially 70° and 80°.

* * * * *